US009667051B2

(12) United States Patent
Wiertek et al.

(10) Patent No.: US 9,667,051 B2
(45) Date of Patent: May 30, 2017

(54) POWER TERMINAL ENCLOSURE FOR POWER CONDUCTORS

(71) Applicant: Rockwell Automation Technologies, Inc., Mayfield, OH (US)

(72) Inventors: Artur J. Wiertek, Bedzin (PL); Troy M. Bellows, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/927,891

(22) Filed: Oct. 30, 2015

(65) Prior Publication Data

US 2017/0125992 A1     May 4, 2017

(51) Int. Cl.
    *H02G 3/22*     (2006.01)
    *H02G 15/06*     (2006.01)

(52) U.S. Cl.
    CPC ............ *H02G 3/22* (2013.01); *H02G 15/06* (2013.01)

(58) Field of Classification Search
    CPC ................................ H02G 3/22; H02G 15/06
    USPC .................................................. 174/660, 659
    See application file for complete search history.

(56) References Cited

U.S. PATENT DOCUMENTS

| 3,665,257 A | * | 5/1972 | De Heus | H01H 1/385 |
| | | | | 200/48 R |
| 5,574,259 A | * | 11/1996 | Meltsch | G02B 6/445 |
| | | | | 174/91 |
| 7,060,902 B2 | * | 6/2006 | Mahn | H02G 5/025 |
| | | | | 174/68.2 |
| 8,420,935 B2 | | 4/2013 | Malkowski, Jr. et al. | |
| 2002/0023769 A1 | * | 2/2002 | Pioch | H01B 17/303 |
| | | | | 174/70 B |
| 2016/0197459 A1 | * | 7/2016 | Motta | H02B 1/26 |
| | | | | 361/611 |

FOREIGN PATENT DOCUMENTS

| JP | 2015137670 | * | 7/2015 | |
| MX | PA04005700 | * | 12/2004 | ............ H02G 5/025 |

\* cited by examiner

*Primary Examiner* — Timothy Thompson
*Assistant Examiner* — Charles Pizzuto
(74) *Attorney, Agent, or Firm* — Boyle Fredrickson, S.C.

(57) ABSTRACT

A power terminal enclosure may be used to provide power conductors (power terminals) across electrical isolation boundaries while providing electrical short-circuit protections. The power terminal enclosure may be a single article molded from an electrically insulating material. The power terminal enclosure may also be dimensioned to provide sufficient separation distance between other power terminal enclosures for a given maximum voltage of a power conductor (power terminal) so that power conductors enclosed by the power terminal enclosures are properly spaced apart with a minimum separate distance. The power terminal enclosure may also include a mechanical retention mechanism, such as a snap-fit retention area, for mating with a power conductor enclosed by the power terminal enclosure. The power terminal enclosure may partially pass through an opening in an isolation barrier (such as a wall and/or plate), with the power conductor passing through the power terminal enclosure.

20 Claims, 13 Drawing Sheets

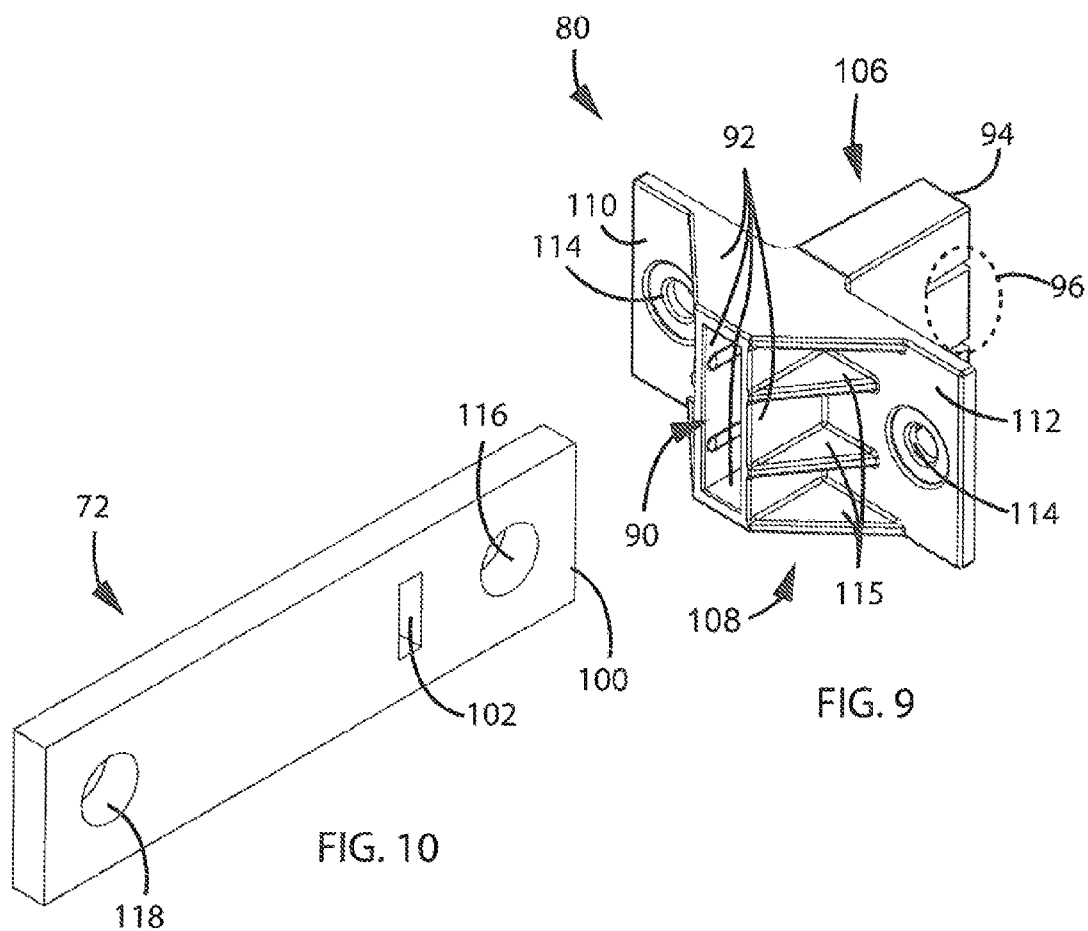

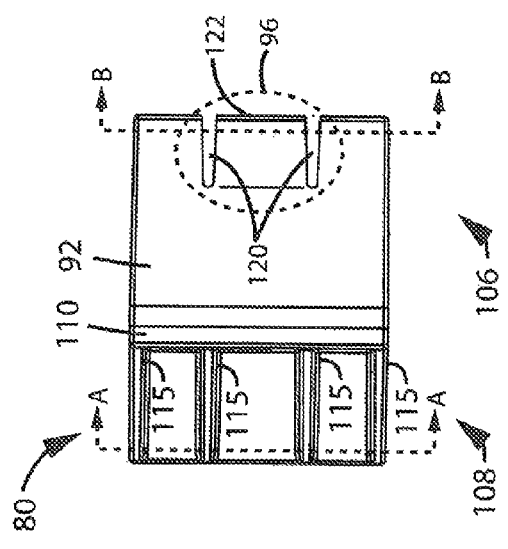
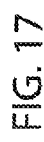
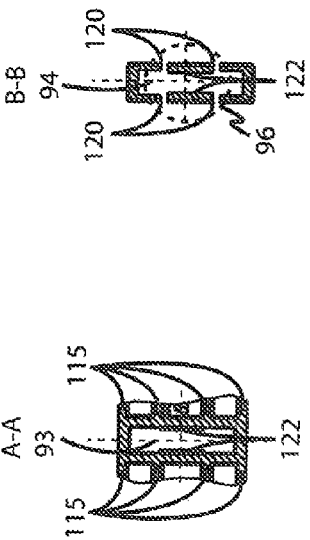
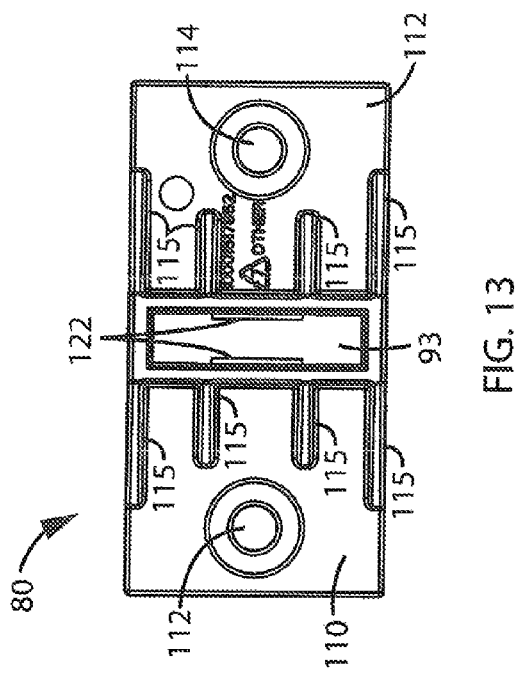
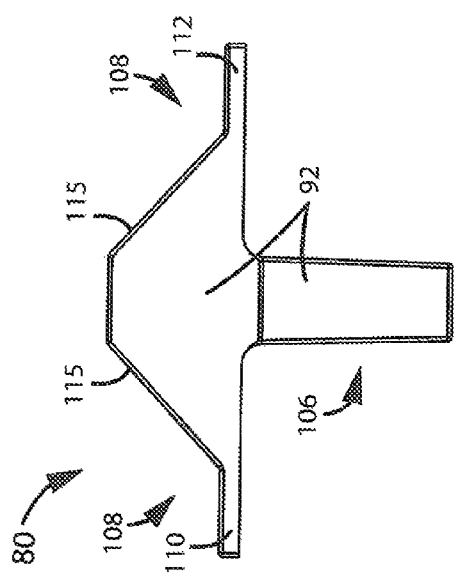

POWER TERMINAL ENCLOSURE FOR POWER CONDUCTORS

FIELD OF THE INVENTION

The present invention relates generally to electrical systems, and more particularly, to electrical power distribution in such systems.

BACKGROUND

Electrical systems with packaged electrical and electronic components are known and are in use. For example, Motor Control Centers (MCC's) are used for power and data distribution in large and industrial operations. In MCC's, a variety of components, such as switchgear, semiconductor power electronic circuits, programmable logic controllers, motor controllers, and so forth, are housed in large electrical enclosures that may be subdivided into sections or columns, which may be further subdivided into compartments. The MCC includes associated bus bars, interconnections and supporting structures for distribution of electrical power to the various compartments.

Typically, the MCC is connected to a main power line that may feed three-phase AC power to horizontal bus bars of the MCC. The horizontal bus bars, in turn, may feed the three-phase power to vertical bus bars disposed in each of the sections or columns of the MCC. The vertical bus bars, in turn, may feed the three-phase power to various units (which typically include electrical components) that are installed in compartments of a section. The units, in turn, may provide power terminals (conductors), such as copper bus bars, for feeding the three-phase power to a system environment, such as motors, as may be required for various applications.

However, in order to meet minimum electrical short-circuit protections, such as in accordance with International Electrotechnical Commission (IEC) and/or Underwriters Laboratories (UL) standards, power conductors, including the power terminals provided for making electrical connections to system environments, typically must be sufficiently insulated and mounted with adequate distance from other conductive parts (including neighboring power conductors). Moreover, in order to meet increased electrical isolation and protection standards, such as in accordance with IEC 61439-2 Forms 3, 3a, 4 or 4b, power conductors typically must also be provided through electrical isolation barriers or boundaries, such as electrically conductive walls or plates.

Consequently, complex arrangements in which bent power terminals, insulating layers, base plates and fasteners are often required to provide power terminals while meeting such protection standards. For example, in one arrangement, a unit such as a circuit breaker may require a first set of bus bars interior to the unit, a second set of bus bars external to the unit, insulating layers between the internal and external bus bars along a conductive wall or plate (isolation barrier), adequate supports, and fasteners, such as bolts, screws, washers and/or nuts, for joining the first and second sets of bus bars. However, such arrangements can be costly, require long assembly times and be cumbersome to implement with a possibility of error.

SUMMARY OF THE INVENTION

The present inventors have recognized that a power terminal enclosure may be used to provide power conductors (power terminals) across electrical isolation barriers while providing electrical short-circuit protections. The power terminal enclosure may be a single article molded from an electrically insulating material. The power terminal enclosure may also be dimensioned to provide sufficient separation distance between other power terminal enclosures for a given maximum voltage of a power conductor so that power conductors enclosed by the power terminal enclosures are properly spaced apart with a minimum separate distance. The power terminal enclosure may also include a mechanical retention mechanism, such as a snap-fit retention area, for mating with a power conductor enclosed by the power terminal enclosure. The power terminal enclosure may partially pass through an opening in an isolation barrier (such as a wall and/or plate), with the power conductor passing through the power terminal enclosure. The power terminal enclosure may also include apertures or other features for allowing fastening to the isolation barrier.

As a result, power terminals may be provided through an isolation barrier while ensuring electrical isolation from one another. This may provide an improved mechanism for assembly with reduced costs while still providing protection from hazards such as "arc flash" (a phenomena in which a luminous discharge of current is formed when a current jumps a gap, through air or gas, in a circuit or between two conductors).

Aspects of the invention may include an enclosure for a power terminal permitting faster and/or increasingly safe connections. The power terminal enclosure may provide appropriate distances from conductive parts, such as according to IEC standards, with sufficient insulation and strength to protect against short-circuit conditions. The power terminal enclosure may use a mechanical retention feature (such as a snap-fit connection not requiring any fasteners). The power terminal enclosure may also provide a robust design using an insulating, moldable material, thereby allowing increased flexibility and reduction in assembly costs.

Accordingly, a power terminal enclosure of the present invention may provide several advantages with a single part, including: a mechanical retention feature which may provide faster assembly without the need for fasteners to tighten a conductive connector inside an MCC module in addition to separate safety connections; adequate insulation from other conductive parts; adequate separation distances; mechanical properties to ensure the power terminal enclosure may withstand a short circuit condition; and/or reduction in costs due to using a moldable material and faster assembly.

Specifically then, one aspect of the present invention provides a power terminal enclosure including: a surrounded cavity having first and second openings, the first and second openings being configured to allow an edge of a power conductor to pass through the cavity; and a retention area provided in the cavity, the retention area being configured to engage a feature of the power conductor to mechanically retain the power conductor in the cavity. The power terminal enclosure may be configured to provide electrical insulation for a portion of the power conductor surrounded in the cavity.

Another aspect may provide a system for providing power including: a power conductor having an edge and a mechanical retention feature; and a power terminal enclosure. The power terminal enclosure may include: a surrounded cavity having first and second openings, the first and second openings being configured to allow the edge of the power conductor to pass through the cavity; and a retention area provided in the cavity, the retention area being configured to engage the mechanical retention feature of the power conductor to mechanically retain the power conductor in the cavity. The power terminal enclosure may be configured to provide electrical insulation for a portion of the power conductor surrounded in the cavity.

Another aspect may provide a unit for an electrical system including: multiple walls, with at least one wall including first and second interior openings; an electrical component provided between the multiple walls; first and second power conductors in communication with the electrical component, the first and second power conductors each having an edge and a mechanical retention feature; and first and second power terminal enclosures. The first and second power terminal enclosures may each provide: a surrounded cavity having first and second openings, the first and second openings being configured to allow an edge of a power conductor to pass through the cavity; and a retention area provided in the cavity, the retention area being configured to engage a feature of the power conductor to mechanically retain the power conductor in the cavity. The power terminal enclosure may be configured to provide electrical insulation for a portion of the power conductor surrounded in the cavity. The first and second power terminal enclosures may receive and mechanically retain the first and second power conductors, respectively, and a portion of the first and second power terminal enclosures may pass through the first and second interior openings, respectively.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 9 is an isometric view of a power terminal enclosure in accordance with an embodiment of the invention;

FIG. 10 is an isometric view of a power conductor having a mechanical retention feature in accordance with an embodiment of the invention:

FIG. 13 is a front view of the power terminal enclosure of FIG. 9;

FIG. 14 is a top view of the power terminal enclosure of FIG. 9;

FIG. 15 is a side view of the power terminal enclosure of FIG. 9;

FIG. 16 is a cross-section of the power terminal enclosure, as shown in FIG. 15, taken along the line A-A;

FIG. 17 is a cross-section of the power terminal enclosure, as shown in FIG. 15, taken along the line B-B.

DETAILED DESCRIPTION

Figure 1:
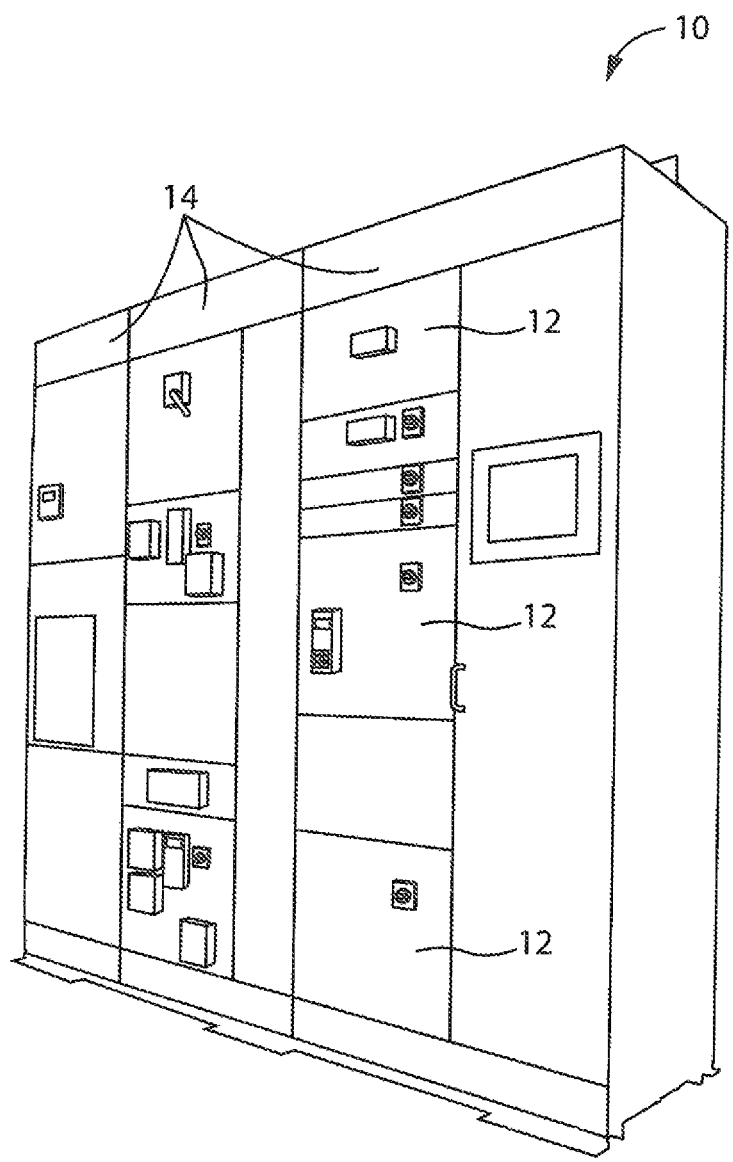
FIG. 1 is an isometric view of an exemplar electrical system in which electrical units of various types may be housed in accordance with an embodiment of the invention.
Figure 2:
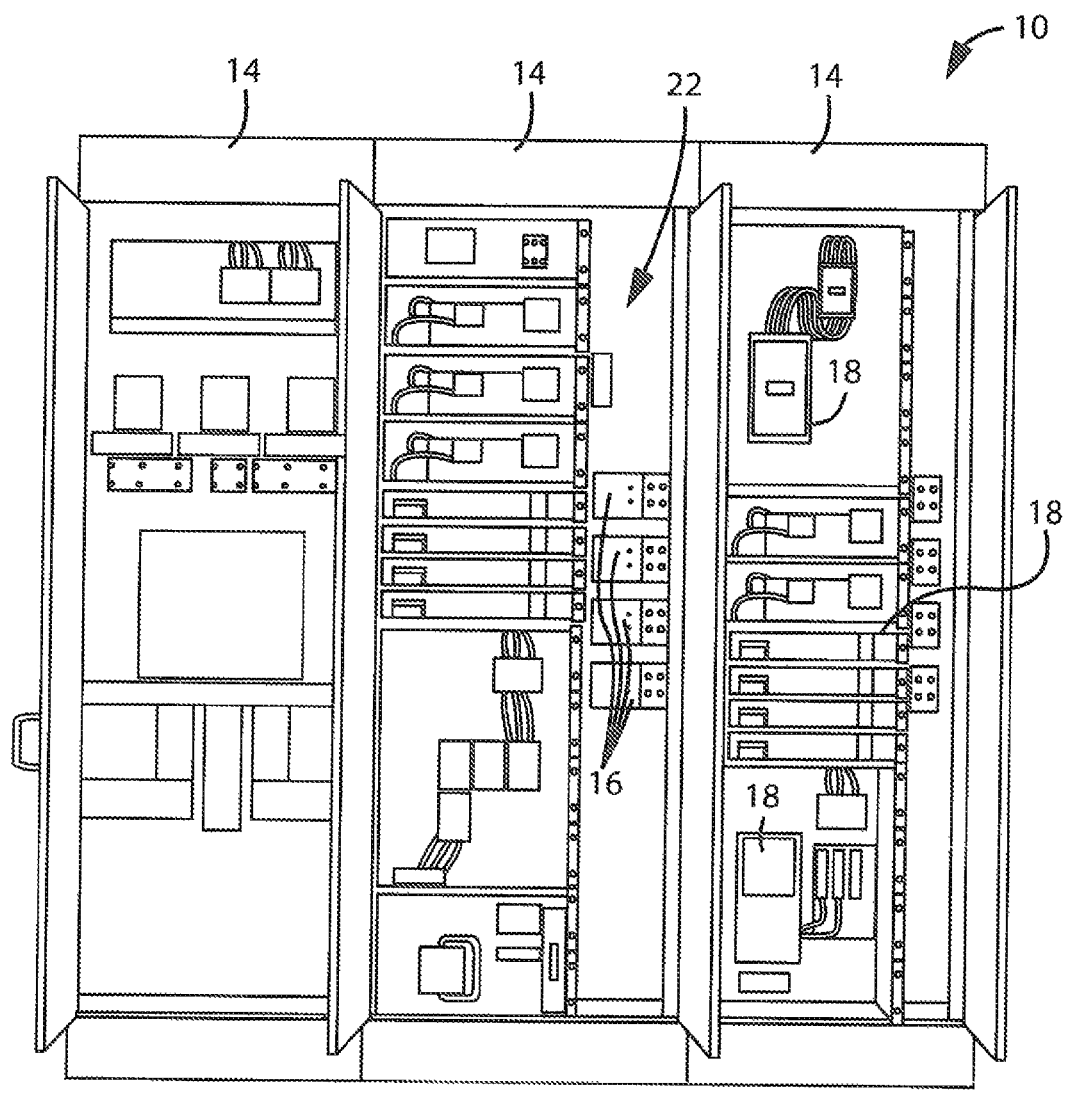
FIG. 2 is an interior view of the electrical system of FIG. 1.

Referring now to FIGS. 1 and 2, an exemplar electrical system 10 is provided in which electrical units 12 of various types may be housed. The electrical system 10 may be, for example, a Motor Control Center ("MCC") or other industrial, commercial, marine, or other electrical system. In general, the electrical system 10 may provide one or more sections 14, each forming a shell around a device mounting volume for supporting the units 12. The shell may be made of any suitable material, such as heavy gage sheet metal, reinforced plastics, and so forth. The electrical system 10 may typically receive three-phase power from an external power supply, such as a power supply grid, and/or data signals, via appropriate conduits (not shown), and distribute the received power and/or data signals to one or more of the sections 14 in various manners. The sections 14 may be electrically isolated from one another, or alternatively, may be electrically joined with other sections 14, such as via common horizontal power buses 16.

The units 12 may each include a door for covering an assembly of components 18 that are supported within each unit 12 via known methods, such as screwed ("fixed feed" or "frame mounted") or snap-in ("withdrawable") engagement, thereby providing mechanical and electrical connection to the electrical system 10. Exemplary components 18 of the units 12 may include relays, motor starters, and Programmable Logic Controllers ("PLC's"), among others. Doors for the units 12 may include, for example, a lever (uch as a rotary lever to turn ON and OFF a Circuit Breaker inside the unit and enabling opening of the door when the Circuit Breaker is OFF), a lock for preventing the door from opening, and/or light for indicating a safe condition for opening the door. A latch rail (not shown) may be provided in each section 14 to interface with latches on the individual doors of the units 12.

The sections 14 may also include wire-ways 20 in which line and load wiring, cabling and so forth may be installed to service the components 18. The sections 14 may optionally include preconfigured isolation areas 22 for variations in which greater electrical isolation between sections 14 is desired, such as in compliance with IEC 61439-2 Forms 3, 3a, 4 or 4b.

Figure 3:
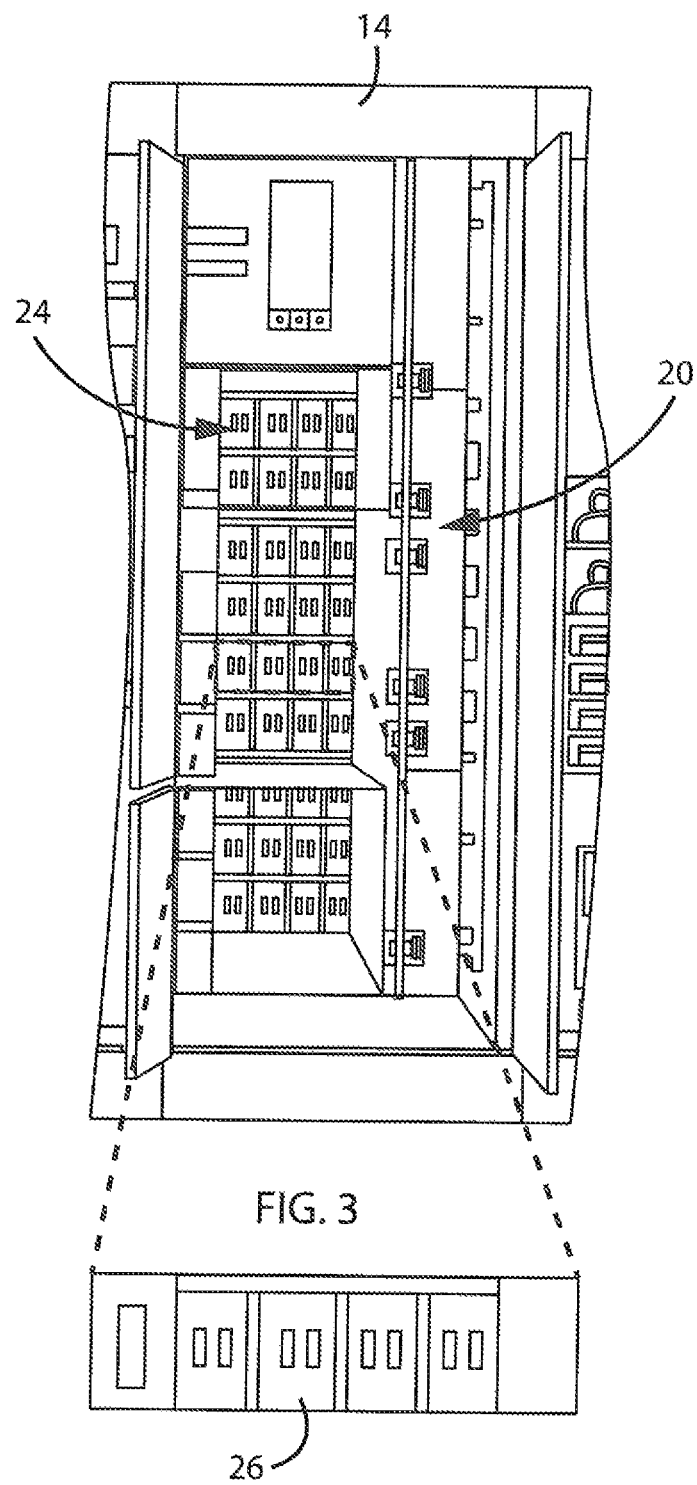
FIG. 3 is an interior view of a section of the electrical system of FIG. 1.

Referring also to FIG. 3, along a rear wall of each of the sections 14 may be disposed a vertical bus system 24 configured to facilitate distribution of power throughout a corresponding section 14, such as in a plug-in manner. The bus system 24 may be generally formed as a backplane having slots 26 for receiving conventional stab-type electrical connections on rear surfaces of device supports received within a section 14. Such slot and stab arrangements are generally known in the art. As illustrated, the slots 26 may be divided into pairs to receive a corresponding two-pronged stab for each phase of electrical power. Rows of such slots 26 may be provided to allow device supports to be mounted at various levels within a section 14.

Figure 4:
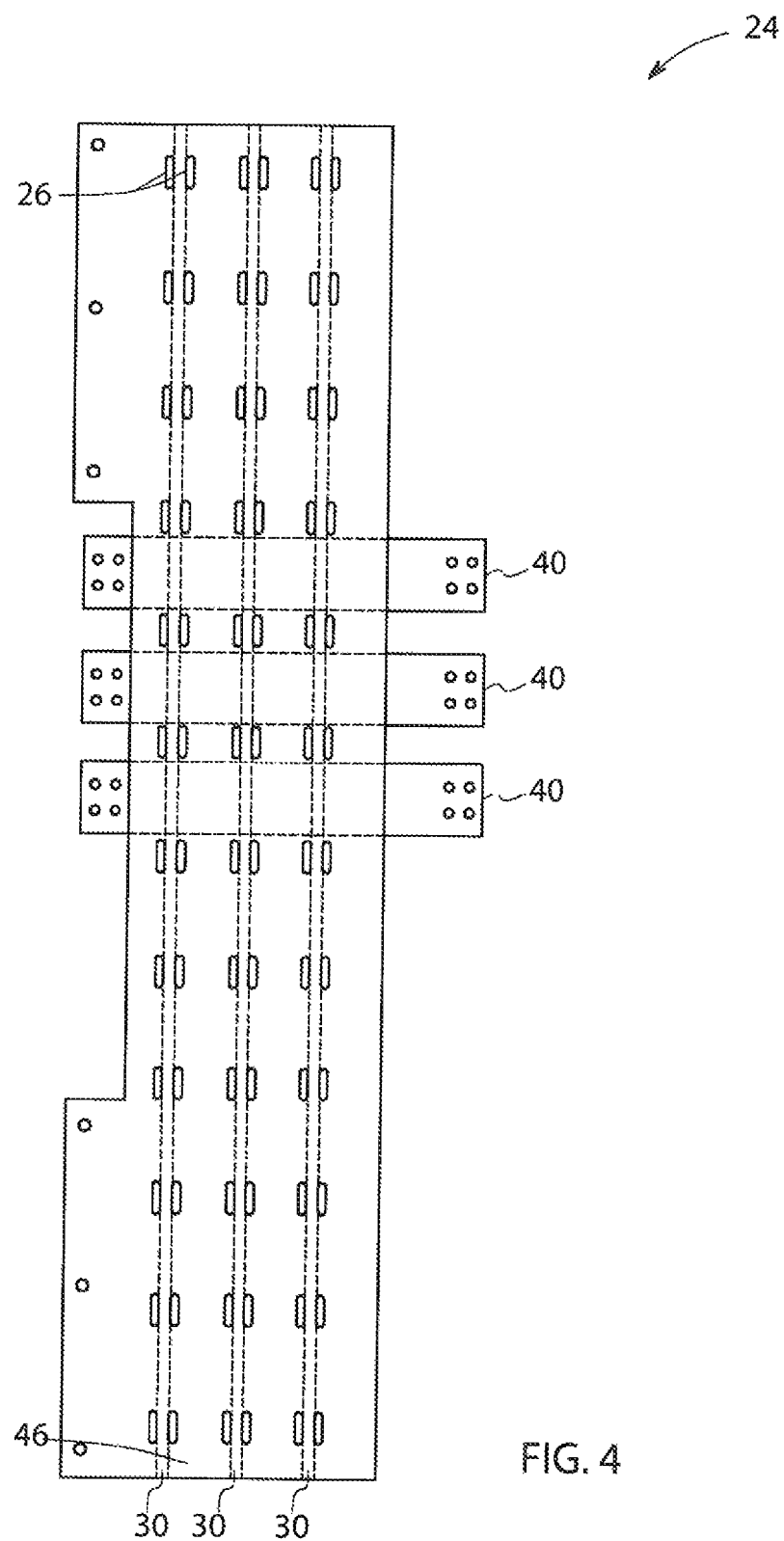
FIG. 4 is an exemplary configuration of the bus system of FIGS. 1-3.

Referring now to FIG. 4, an exemplary configuration of the bus system 24 of FIGS. 1-3 is provided. The bus system 24 may include multiple power busses disposed within a section 14. In the illustrated embodiment, the bus system 24 includes first, second and third vertical bus conductors 30 disposed proximal to one another, which may correspond to differing phases of a three-phase power system (power conductors). Further, the bus system 24 includes first, second and third horizontal bus conductors 40 disposed proximal to one another, which may also correspond to the differing phases of the three-phase power system (power conductors), but in a different direction.

In certain embodiments, the horizontal bus conductors 40 could be coupled to cabling that supplies three-phase power from an external power supply, such as a power supply grid, and the first, second and third horizontal bus conductors 40 could be coupled to the first, second and third vertical bus conductors 30. Also, in certain embodiments, the horizontal bus conductors 40 of one section could be coupled (or "spliced") with the horizontal bus conductors 40 of another (flanking) section. In alternative embodiments, more horizontal and/or vertical bus conductors could be provided, such as for providing a neutral conductor, a protective earth, ground or additional power phase, or fewer horizontal and/or vertical bus conductors could be provided, as appropriate for the environment.

The bus system 24 may include a bus cover 46 and a rear bus support that will be described in greater detail below. In the illustrated embodiment, the bus cover 46 may include a molded sheet of synthetic material disposed over the vertical and horizontal bus conductors and may serve to prevent contact with underlying power busses except through the slots 26. The vertical bus conductors 30 are typically made of a bar stock or tubing stock with a flat area that permits them to be mechanically and electrically coupled to corresponding horizontal bus conductors 40 in the bus system 24.

Connection of component supports (such as mounted on plates or drawers, not shown) may be made by two pronged stabs that are received through the slots 26 and engage the individual bus bars behind the bus cover 46. As described above, the bus system 24 further includes a bus support configured to support the vertical and horizontal bus conductors that is described in detail below with reference to FIG. 5.

Figure 5:
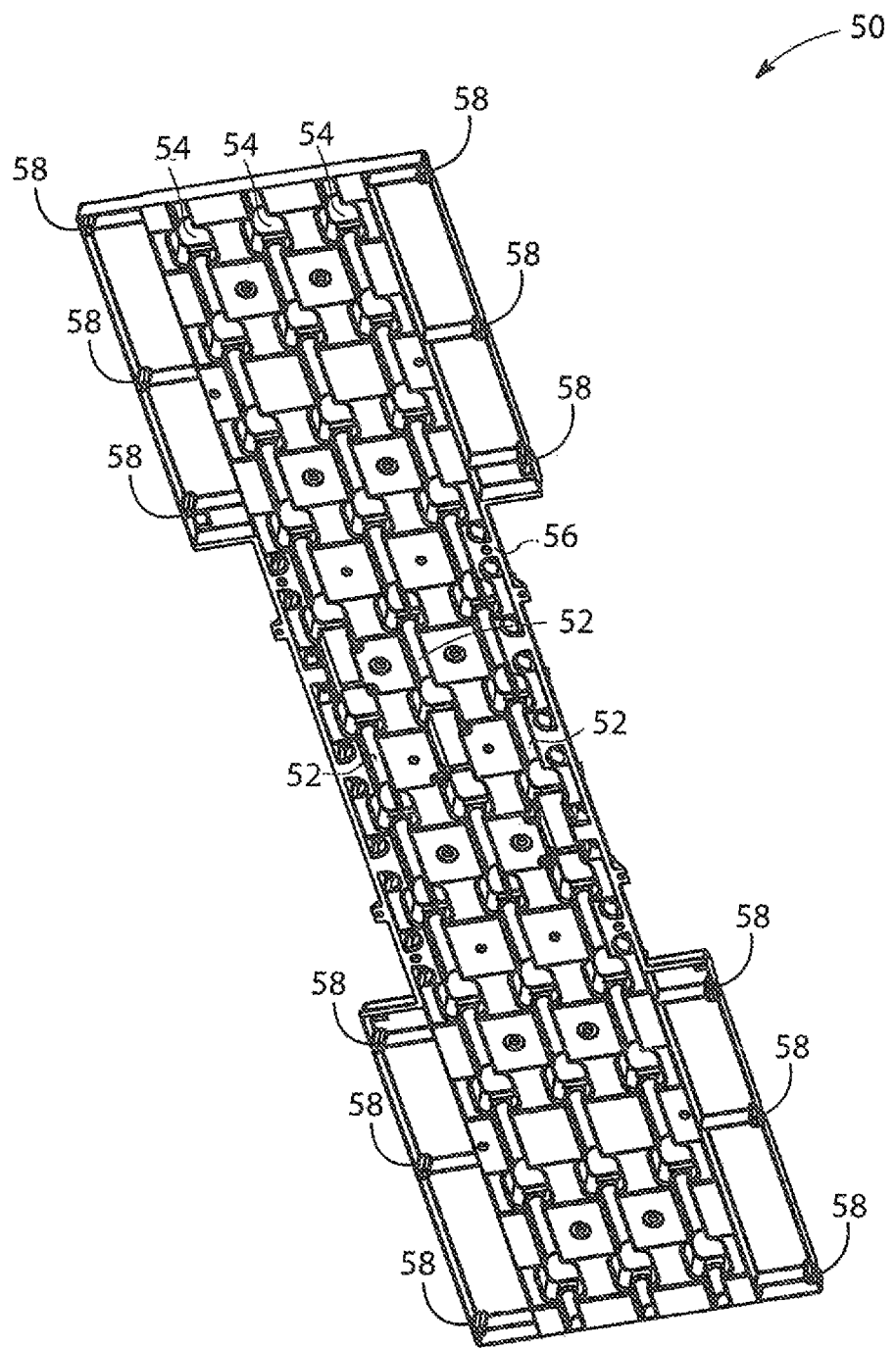
FIG. 5 is an exemplary preconfigured isolated bus support for supporting the power busses of the bus system of FIGS. 1-3.

Referring now to FIG. 5, an exemplary preconfigured isolated bus support 50 is illustrated for supporting the power busses of the bus system 24 of FIG. 3. As illustrated, the bus support 50 may be a molding with vertical channels 52 to receive the vertical bus conductors 30 of FIG. 4. Each of the vertical channels 52 may include rear protrusions 54 on a rear side 56 of the bus support 50. In the illustrated embodiment, the bus support 50 mechanically supports the various horizontal and vertical bus conductors. Within the bus system 24, and generally between the bus support 50 and the bus cover 46 (see FIG. 4), each vertical bus conductor may generally include a connection portion that is engaged by stabs of component supports and a bus anchoring portion.

Accordingly, the horizontal bus conductors 40 (see FIG. 4) may be generally supported on a rear surface of the bus support 50, while the vertical bus conductors 40 (see FIG. 4) may be supported on a front surface thereof. In the illustrated embodiment, the bus support 50 includes a series of apertures 58 or holes for receiving mounting bolts or screws. These apertures 58 will generally be aligned with corresponding apertures in rear of the electrical system 10 to support the bus system 24 when mounted therein. The vertical bus conductors 30 may be received within corresponding recesses of the vertical channels 52. The recesses may generally be semicircular grooves in which the vertical bus conductors 30 may lie.

Opposing the rear protrusions 54, which may be somewhat deeper than the recesses, are pockets designed to receive and accommodate stabs (not shown) of component supports that will protrude through the slots 26 in the bus cover 46. Furthermore, the bus support 50 may include a series of apertures (not shown) that extend completely through the bus support 50 for mechanical and electrical connection to the horizontal bus conductors 40.

In the illustrated embodiment, the bus support 50 may be formed as a single piece of molded plastic material. The material is preferably one that will not degrade or melt with elevated temperatures that may occur during normal operation. In certain embodiments, the bus support 50 may comprise glass filled polyester, a thermoset plastic. The bus support 50 could also include add-on bus support braces (not shown) disposed on the rear side of the bus support which may be configured to contact the channels to limit movement of the vertical bus conductors during a high current event.

Figure 6:
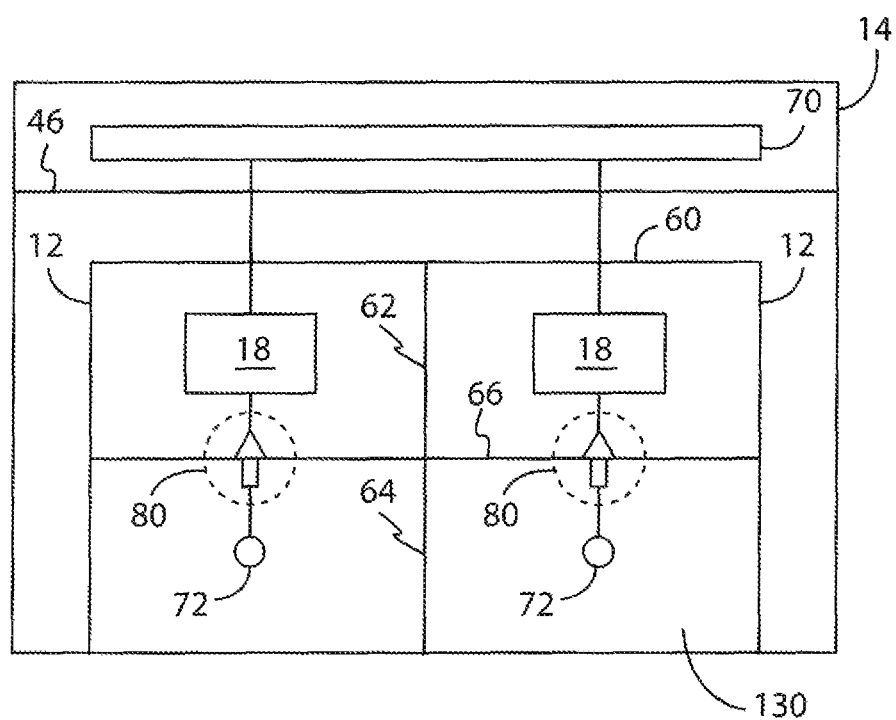
FIG. 6 is a block diagram illustrating power terminal enclosures used to provide power conductors across electrical isolation barriers in accordance with an embodiment of the invention.

Referring now to FIG. 6, a block diagram illustrating power terminal enclosures used to provide power conductors across electrical isolation barriers or boundaries in accordance with IEC 60529 IP20 (International Protection Rating for fingers or similar objects) and/or IEC 61439-2 Form 4b standards is provided. In order to meet this increased protection standard, within a housing (such as a section 14), there is provided: an isolation barrier (such as a bus cover 46 and first wall 60 or mounting plate of unit 12) providing separation of bus bars 70 (such as the vertical bus conductors 30 or the horizontal bus conductors 40) from functional units (such as a components 18 of a units 12); an isolation barrier (such as a second wall 62 of a unit 12) providing separation of functional units from each other; an isolation barrier (such as a third wall 64 of a unit 12) providing separation of power terminals 72 from each other; and an isolation barrier (such as a fourth wall 66 of a unit 12) to ensure the power terminals 72 are not in the same compartment as the associated functional unit. The isolation barriers or boundaries could be, for example, metallic or non-metallic materials aimed at: ensuring protection against direct contact, in case of access to a part of the assembly cut off from the power supply, as to the rest of the assembly still supplied; reducing the probability of striking and propagation of an internal arc; and/or preventing the passage of solid foreign bodies between different parts of the assembly.

To provide the power terminals 72 across an isolation barrier, power terminal enclosures 80 may be used in accordance with an embodiment of the invention. Each power terminal enclosure 80 may be provided through an interior opening in the isolation barrier. The power terminal, in turn, may be provided through the power terminal enclosure 80, and consequently, through the isolation barrier. The power terminal enclosure 80 may also be fastened to the isolation barrier itself via fasteners, and the power terminal enclosure 80 may provide electrical insulation for a portion of the power terminal passing through the power terminal enclosure 80.

Figure 7:
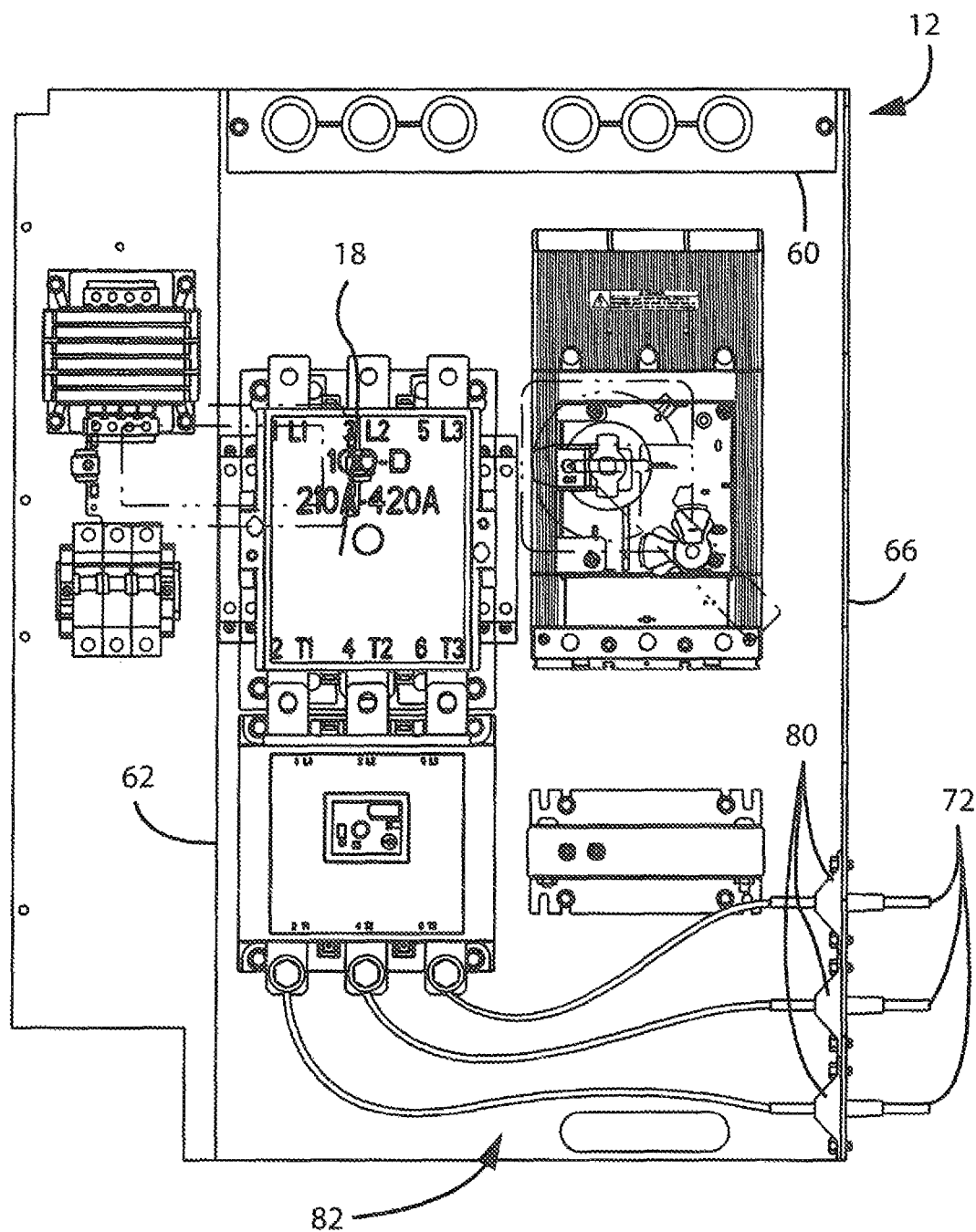
FIG. 7 is a front view of an electrical unit providing power terminal enclosures used to provide power conductors through a wall of the unit, which serves as an electrical isolation barrier, in accordance with an embodiment of the invention.
Figure 8:
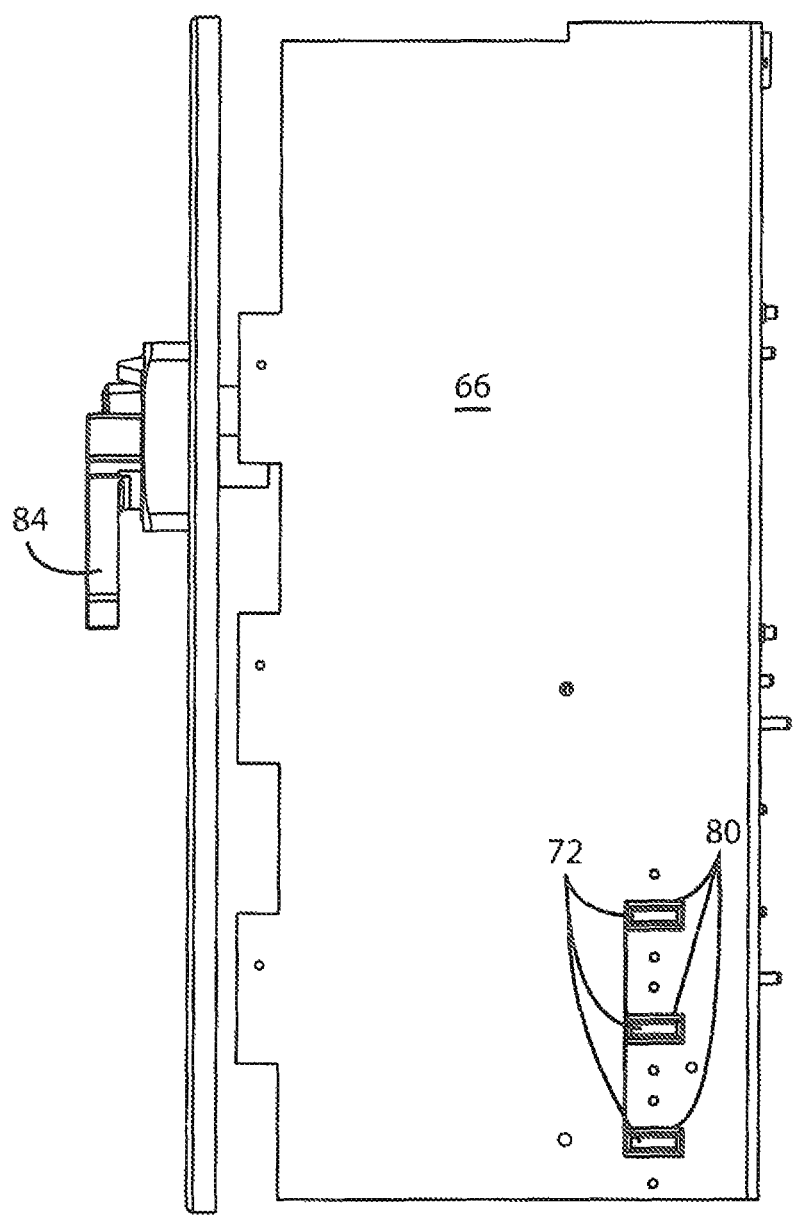
FIG. 8 is a side view of the electrical unit of FIG. 7.

Referring now to FIGS. 7 and 8, front and side views of an exemplar electrical unit 12 are provided in accordance with an embodiment of the invention. A component 18 of the unit 12, which could be contactors and/or overloads, for example, may receive three-phase power from another component 18, which could be a circuit breaker, for example, receiving three-phase power from the vertical bus conductors 30. The component 18 may, in turn, provide the three-phase power to wiring 82 to power conductors, such as power terminals 72, across an isolation barrier. The power terminals 72 may, in turn, provide the three-phase power to the system environment, such as a motor.

To traverse the isolation barrier, power terminal enclosures 80 may partially pass through interior openings in the isolation barrier (the fourth wall 66) of the unit 12. The power terminals 72, in turn, may be provided through the power terminal enclosures 80, and as a result, through the isolation barrier (the fourth wall 66). Ends of the power terminals 72 may then be used, while the system provides protection via an isolation barrier, to connect to the system environment by providing the three-phase power. A lever 84 on a front door or panel the unit 12 may also be provided for opening ("breaking") the circuit when actuated, such as by disconnecting power between the vertical bus conductors 30 and the power terminals 72 via the component 18, or for closing the circuit.

The power terminal enclosures 80 may be fastened to the isolation barrier itself. The power terminal enclosures 80 may provide electrical insulation for a portion of the power terminals 72 passing through the power terminal enclosures 80. The power terminal enclosures 80 may also be dimensioned to provide sufficient separation distance between the adjacent power terminal enclosures 80 for a given maximum voltage of the power terminals 72 so that the power terminals 72 enclosed by the power terminal enclosures 80 are properly spaced apart with a minimum separate distance, such as to minimize are flash and/or provide short-circuit protection.

Reference is now made to FIGS. 9 and 13-17, including various views of a power terminal enclosure 80, which may provide IEC 61439-2 Form 4b electrical separation, together with FIG. 10, providing an isometric view of a power terminal 72 (power conductor) having a mechanical retention feature, each in accordance with an embodiment of the invention. The power terminal enclosure 80 includes a cavity 90 that is circumferentially surrounded, such as by walls 92 of the power terminal enclosure 80. The surrounded cavity 90 includes first and second openings, 93 and 94, respectively, which may be opposing openings as illustrated, and which are configured to allow an edge 100 of the power terminal 72 to pass through the cavity 90. Accordingly, the opposing openings may provide a substantially straight, linear path for a power conductor to pass through a cavity of a power terminal enclosure 80 in order to efficiently traverse an electrical isolation barrier.

The power terminal 72 includes a retention area 96 provided in the cavity. The retention area 96 may preferably be integrated with one or more walls which surround the cavity 90. The retention area 96 is configured to engage a mechanical retention feature 102, which may be an aperture or hole of the power terminal 72, to mechanically retain the power terminal 72 in the cavity 90.

Figure 11:
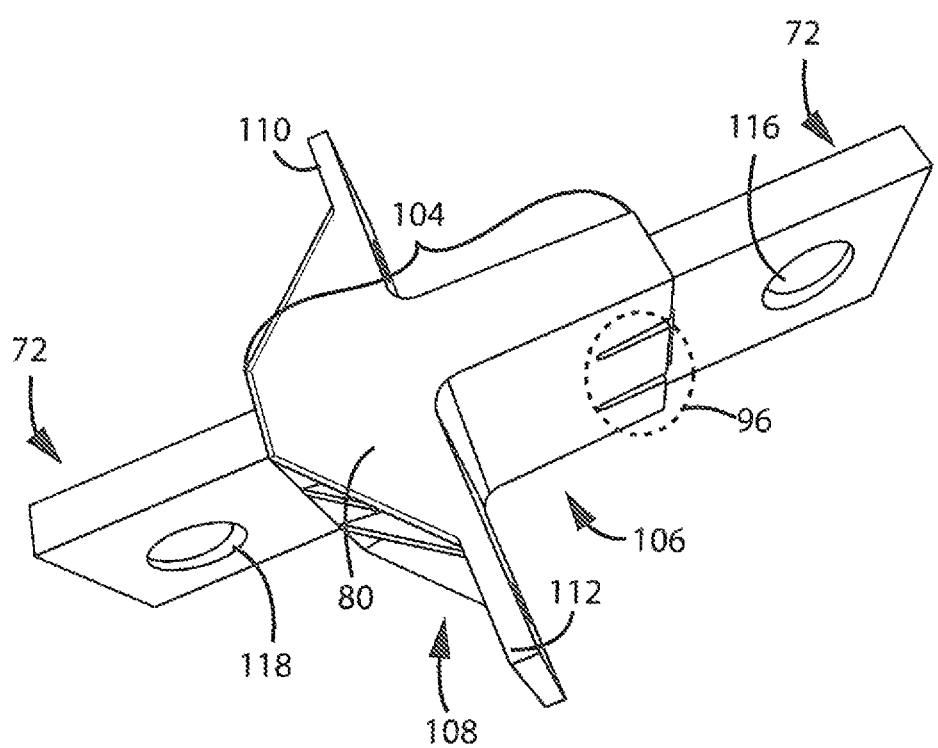
FIG. 11 is an isometric view the power conductor of FIG. 10 pass through the power terminal enclosure of FIG. 9.

Referring also to FIG. 11, an isometric view the power terminal 72, passing through the power terminal enclosure 80 and being mechanically retained by the power terminal enclosure 80, is provided in accordance with an embodiment of the invention. The power terminal enclosure 80 may be advantageously molded from a single material. In addition, the power terminal enclosure 80 may be made from an electrically insulating material, such as plastic. Accordingly, the power terminal enclosure 80 may provide electrical insulation for an insulation portion 104 of the power terminal 72 surrounded in the cavity 90.

In operation, a first area 106 of the power terminal enclosure 80 partially passes through an opening in an isolation barrier. A second area 108 of the power terminal enclosure 80 does not pass through the opening, but rather remains on a side of the isolation barrier proximal to component 18. First and second wings, 110 and 112, respectively, may extend outward from the surrounded cavity 90, transversely in opposing directions in the second area 108. The First and second wings, 110 and 112, respectively, may prevent the power terminal enclosure 80 from completely passing through the opening in an isolation barrier. Apertures 114, holes or other retaining means may be provided on the wings for fastening the power terminal enclosure 80 to the isolation barrier (or wall), such as by receiving bolts or screws coupled with washers and nuts on either side of the isolation barrier. Multiple angled support members 115 may also extend between the surrounded cavity 90 and the first and second wings, 110 and 112, respectively, for providing increased rigidity and mechanical strength.

The power terminal 72 could provide a first power terminal aperture 116, hole or other connection means proximal to the edge 100 of the power terminal 72 (past the first area 106) for connecting to the system environment. The power terminal 72 could also provide a second power terminal aperture 118, hole or other connection means distal to the edge 100 of the power terminal 72 (before the second area 108) for connecting to the component 18 (such as via wiring 82). The power terminal 72 could be, for example, a copper bus bar.

Figure 12:
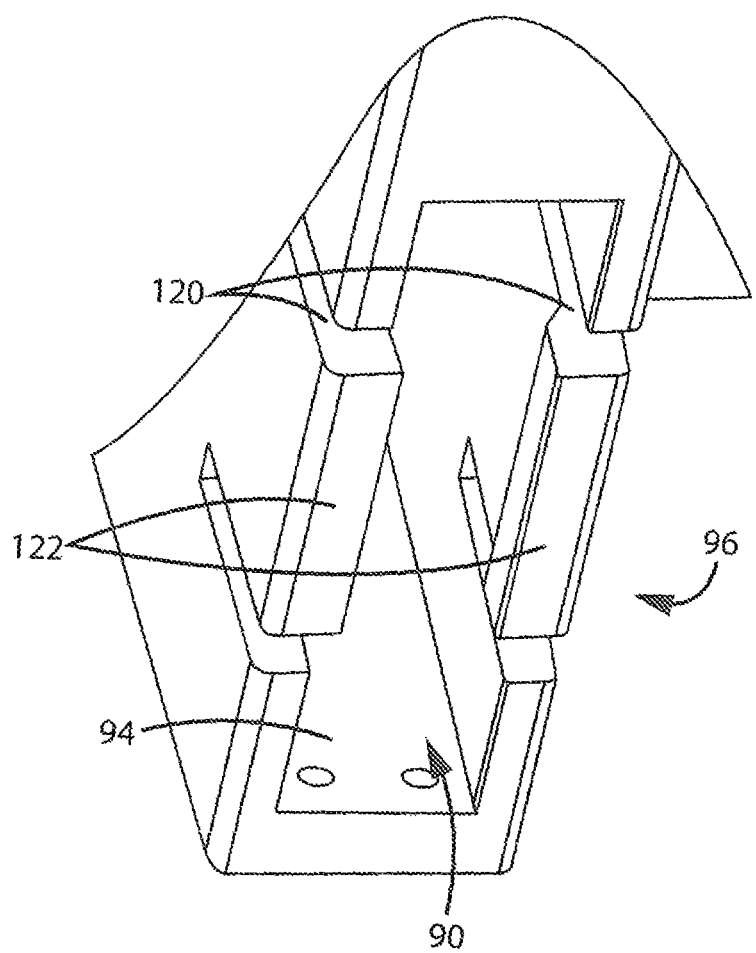
FIG. 12 is a detailed view of a retention area of the power terminal enclosure of FIG. 9.

Referring now to FIG. 12, a detailed view the retention area 96 of the power terminal enclosure 80 is provided in accordance with an embodiment of the invention. In one aspect, the retention area 96 could be provided at an edge of the second opening 94. The retention area 96 may be formed to urge inward with respect to the cavity 90. The retention area 96 may be configured of shape and material to deflect outward upon receiving the edge 100 of the power terminal 72; then urge back inward (upon loss of force from the power terminal 72 pushing through) to engage the mechanical retention feature 102 of the power terminal 72 in order to mechanically retain the power terminal 72 in the cavity 90 in a "snap-fit" arrangement. Accordingly, the retention area 96 may include grooves 120 allowing the retention area 96 to urge inward and deflect outward, free from the walls of the second opening 94.

The retention area 96 may include one or more tabs 122, which may be opposing tabs, for engaging the mechanical retention feature 102. The tabs 122 may protrude inward with respect to the cavity 90 and may assist in positively retaining the power terminal 72 by fitting into the aperture or hole of the mechanical retention feature 102. A screwdriver or similar tool may be subsequently used to pry the retention area 96 from the mechanical retention feature 102 to release the power terminal 72 from the power terminal enclosure 80.

Figure 18:
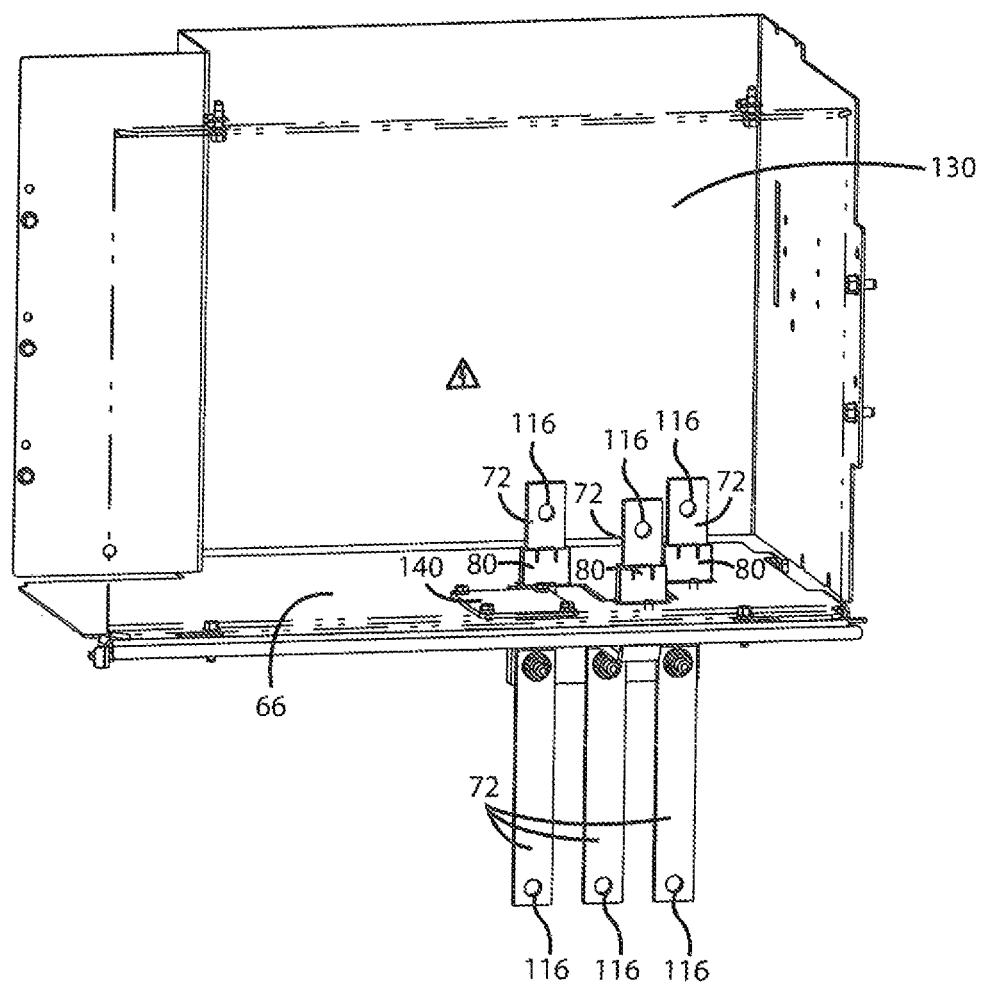
FIG. 18 is an isometric view of an isolation barrier area of the electrical system of FIG. 1 in which power terminal enclosures are provided in accordance with an embodiment of the invention.

Referring now to FIG. 18, an isometric view of an isolation barrier area 130 (or "4b box") for the electrical system of FIG. 1 is provided in accordance with an embodiment of the invention. The isolation barrier area 130 may be an area in which in which power terminals 72 are provided across an isolation barrier for connecting to a system environment. Each power terminal enclosure 80 is dimensioned (such as with respect to the lengths of the first and second wings, 110 and 112, respectively) to provide sufficient separation distance between other power terminal enclosures 80 to ensure safe connection distances for a given maximum voltage (and/or current) of the power terminals 72 (power conductor) enclosed by the power terminal enclosures 80. In other words, due to the dimensions of each power terminal enclosure 80 (including as provided by the first and second wings, 110 and 112, respectively), the power terminal enclosures 80 can be placed no closer together than would be allowed by neighboring power terminal enclosures 80 being in contact with one another (touching end to end, or wing to wing).

Also, as shown in FIG. 18, three power terminals 72 are provided such as for three phase power system. A plate 140 could cover fourth opening in the isolation barrier (such as the fourth wall 66 of a unit 12). The plate 140 could be removed, for example, to provide another power terminal enclosures 80 and power terminals 72, such as for providing a neutral conductor, a protective earth, ground or additional power phase.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention: The embodiments described herein explain the best modes known for practicing the invention and will enable others skilled in the art to utilize the invention. All of the publications described herein including patents and non-patent publications are hereby incorporated herein by reference in their entireties.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

What is claimed is:

1. A power terminal enclosure comprising:
    a surrounded cavity having first and second openings, the first and second openings being configured to allow an edge of a power conductor to pass through the cavity;
    a retention area provided in the cavity, the retention area being configured to engage a feature of the power conductor to mechanically retain the power conductor in the cavity; and
    a wing extending outward from the surrounded cavity, the wing including an aperture for receiving a fastener,
    wherein the power terminal enclosure is configured to provide electrical insulation for a portion of the power conductor surrounded in the cavity.

2. The power terminal enclosure of claim 1, wherein the first and second openings are opposing openings.

3. The power terminal enclosure of claim 1, wherein the retention area is provided at an edge of the second opening.

4. The power terminal enclosure of claim 3, wherein the retention area is formed to urge inward with respect to the cavity and the retention area is configured to deflect outward upon receiving an edge of the power conductor.

5. The power terminal enclosure of claim 4, wherein the retention area includes a tab protruding inward with respect to the cavity, and the tab is configured to engage an aperture in the power conductor upon urging inward to mechanically retain the power conductor.

6. The power terminal enclosure of claim 1, wherein the wing is a first wing, and further comprising a second wing extending outward from the surrounded cavity, the second wing including an aperture for receiving a fastener.

7. The power terminal enclosure of claim 1, wherein the wing extends transversely with respect to the surrounded cavity, and further comprising a plurality of angled support members extending between the surrounded cavity and the wing.

8. The power terminal enclosure of claim 6, wherein the first and second wings extend in opposing directions.

9. The power terminal enclosure of claim 1, wherein the power terminal enclosure is molded from a single electrically insulating material.

10. A system for providing power comprising:
    a power conductor having an edge and a mechanical retention feature; and
    a power terminal enclosure including:

a surrounded cavity having first and second openings, the first and second openings being configured to allow the edge of the power conductor to pass through the cavity; and a retention area provided in the cavity, the retention area being configured to engage the mechanical retention feature of the power conductor to mechanically retain the power conductor in the cavity, wherein the power terminal enclosure is configured to provide electrical insulation for a portion of the power conductor surrounded in the cavity.

11. The system of claim 10, wherein the power conductor is a copper bus bar, the mechanical retention feature is an aperture in the copper bus bar, and the power terminal enclosure is molded from a single electrically insulating material.

12. The system of claim 10, wherein the retention area is provided at an edge of the second opening.

13. The system of claim 12, wherein the retention area is formed to urge inward with respect to the cavity and the retention area is configured to deflect outward upon receiving the edge of a power conductor.

14. The system of claim 13, wherein the mechanical retention feature is an aperture in the power conductor, the retention area includes a tab protruding inward with respect to the cavity, and the tab is configured to engage the aperture upon urging inward to mechanically retain the power conductor.

15. The system of claim 10, further comprising a wing extending outward from the surrounded cavity, the wing including an aperture for receiving a fastener.

16. The system of claim 15, wherein the wing extends transversely with respect to the surrounded cavity, and further comprising a plurality of angled support members extending between the surrounded cavity and the wing.

17. The system of claim 15, wherein the wing is a first wing, and further comprising a second wing extending outward from the surrounded cavity, wherein the first and second wings extend in opposing directions.

18. A unit for an electrical system comprising:
a plurality of walls, wherein at least one wall includes first and second interior openings;
an electrical component provided between the plurality of walls;
first and second power conductors in communication with the electrical component, the first and second power conductors each having an edge and a mechanical retention feature; and
first and second power terminal enclosures, the first and second power terminal enclosures each providing:
a surrounded cavity having first and second openings, the first and second openings being configured to allow an edge of a power conductor to pass through the cavity; and
a retention area provided in the cavity, the retention area being configured to engage the feature of the power conductor to mechanically retain the power conductor in the cavity, wherein the power terminal enclosure is configured to provide electrical insulation for a portion of the power conductor surrounded in the cavity,
wherein the first and second power terminal enclosures receive and mechanically retain the first and second power conductors, respectively, and a portion of the first and second power terminal enclosures pass through the first and second interior openings, respectively.

19. The electrical system of claim 18, wherein the mechanical retention feature is an aperture, the retention area is formed to urge inward with respect to the cavity, the retention area is configured to deflect outward upon receiving the edge of a power conductor, the retention area includes a tab protruding inward with respect to the cavity, and the tab is configured to engage the aperture upon urging inward to mechanically retain the power conductor.

20. The electrical system of claim 18, wherein the first and second power terminal enclosures each provide first and second wings extending outward from the surrounded cavity, wherein the first and second power terminal enclosures are arranged proximal to one another through the first and second interior openings so that a wing of the first power terminal enclosure is in contact with a wing of the second power terminal enclosure.

* * * * *